UNITED STATES PATENT OFFICE.

LEWIS A. COLEMAN, OF NORFOLK, VIRGINIA, ASSIGNOR TO AMERICAN CHEMICAL & MANUFACTURING COMPANY, INC., OF NORFOLK, VIRGINIA, A CORPORATION OF VIRGINIA.

WATERPROOF FILLER.

1,233,190.     Specification of Letters Patent.     Patented July 10, 1917.

No Drawing.     Application filed March 27, 1915. Serial No. 17,393.

*To all whom it may concern:*

Be it known that I, LEWIS A. COLEMAN, a citizen of the United States, residing at Norfolk, in the county of Norfolk and State of Virginia, have invented new and useful Improvements in Waterproof Fillers, of which the following is a specification.

This invention relates to an improvement in water-proofing filler composition, and has for an object to provide a composition of this character which is of a practical nature and may be applied to any fabric, straw and felt hats, tents, awnings, and the like, in the usual manner of applying paint as by a brush or by immersion; a composition filler which will not change the color of the fabric or stiffen the fabric to which it is applied; and a composition of this character which is durable and will last as long as the fabric itself.

The above objects and advantages of this invention are obtained in a waterproofing filler composition comprising the following parts, the same being given in the relative proportions of a mixture of forty-five gallons:

| | |
|---|---|
| Varnish makers' and paint makers' naphtha | 35 gallons |
| Tri-chlorethylene | 2 gallons |
| #1 rubber cement | 4½ gallons |
| Paraffin wax | 1½ gallons |
| Turpentine | 2 gallons |

These five ingredients of the mixture, as above-named, and in the proportions indicated, are thoroughly mixed together by agitation or stirring, or otherwise suitably mixing the same to thoroughly break up the parts and cause the same to unite as a homogeneous body. The mixture contains innumerable globules of gum rubber cement, paraffin wax, and turpentine or varnish makers' and paint makers' naphtha. The whole mixture is held in suspension by the varnish makers' and paint makers' naphtha and tri-chlorethylene. The varnish makers' and paint makers' naphtha serves as a vehicle for the composition.

The last three ingredients and part, approximately ten gallons, of the first above noted are thoroughly mixed together after which the remaining twenty-five gallons of varnish makers' and paint makers' naphtha, and two gallons tri-chlorethylene are added, so as to complete the mixture. These ingredients are given in the relative proportions of a forty-five gallon mixture.

The above-described composition is not only water-proof, but it is also acid-proof, and of such a nature that a pigment may be added thereto when desired.

It is, of course, understood that the above formula sets forth only the relative proportion of parts, and that the same may be made into mixtures of any desired quantities.

What I claim is:—

1. A water-proofing filler comprising an admixture of varnish makers' and paint makers' naphtha, rubber cement, paraffin wax, turpentine and tri-chlorethylene in substantially the proportions stated.

2. A liquid, waterproofing filler comprising substantially in a combined mixture of forty-five parts, rubber cement 4½ parts, paraffin wax 1½ parts, turpentine 2 parts, and varnish makers' and paint makers' naphtha 35 parts, and tri-chlorethylene 2 parts.

In testimony whereof I have hereunto set my hand in presence of two subscribing witnesses.

LEWIS A. COLEMAN.

Witnesses:
   JONATHAN W. OLD, Jr.,
   JOHN W. EASBY.